W. L. GREENAWAY.
MEANS FOR MOUNTING WATER GAGES.
APPLICATION FILED APR. 13, 1918.
1,281,945.
Patented Oct. 15, 1918.
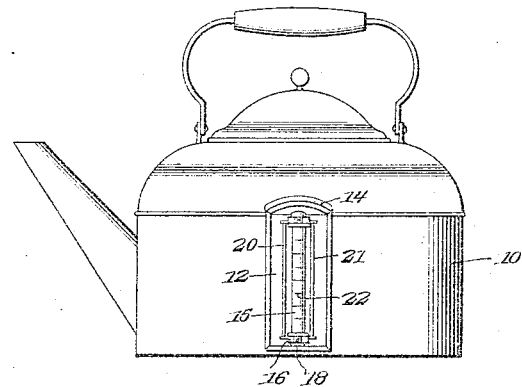
Fig. 1.
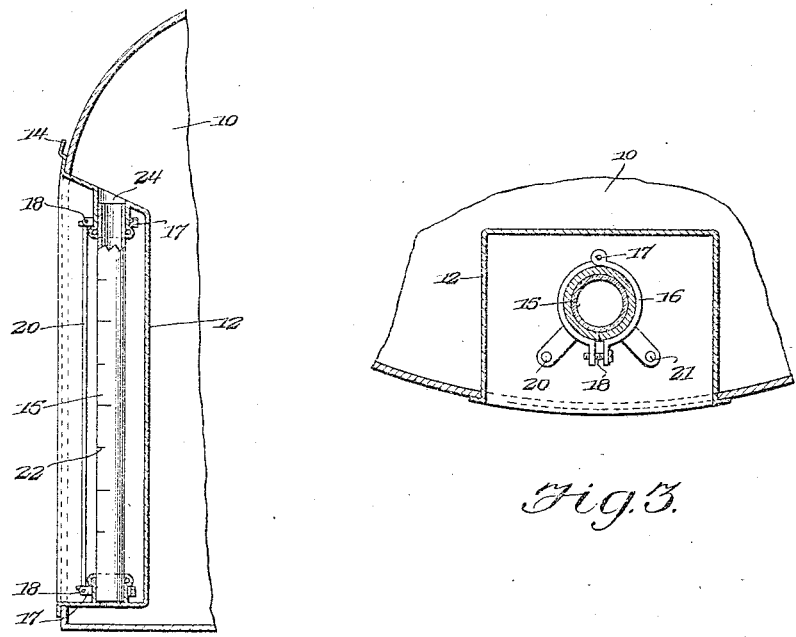
Fig. 2.
Fig. 3.
Witnesses
J. H. Crawford
I. M. Burns
Inventor
W. L. Greenaway,
By Victor J. Evans
Attorney

UNITED STATES PATENT OFFICE.

WILFRED LAURIER GREENAWAY, OF VANCOUVER, BRITISH COLUMBIA, CANADA.

MEANS FOR MOUNTING WATER-GAGES.

1,281,945.  Specification of Letters Patent.  Patented Oct. 15, 1918.

Application filed April 13, 1918. Serial No. 228,486.

*To all whom it may concern:*

Be it known that I, WILFRED L. GREENAWAY, a citizen of the Dominion of Canada, residing at Vancouver, British Columbia, Canada, have invented new and useful Improvements in Means for Mounting Water-Gages, of which the following is a specification.

This invention relates to means for mounting water gages, and one object is to provide in connection with a water heating utensil or other similar receptacle, a casing mounted within the body portion thereof adjacent an opening in the side wall, whereby the tube constituting the gage proper may be retained in a position where it will not be subject to injury and where the depth of the water may readily be ascertained through an opening in the side of the receptacle.

A further object is to provide means whereby the depth of the water in a kitchen utensil such as a tea-kettle may readily be ascertained without the necessity of removing the cover in which operation the escaping steam may cause injury to the individual desiring to make use of the heated water.

A still further object is to provide for ascertaining the quantity of water in a receptacle of the type indicated when a given amount is desired for a particular purpose, the graduations on the scale indicate quarts and fractions of quarts.

With the foregoing and other objects in view the invention consists in the novel construction, combination, and arrangement of elements hereinafter described and claimed.

In the accompanying drawings:

Figure 1 is a view in elevation showing the device on one side of a kettle of the type ordinarily used for heating water for cooking purposes and the like.

Fig. 2 is a fragmentary view in vertical section.

Fig. 3 is a horizontal section through the casing in which the gage is mounted and through the gage proper.

A water gage mounted as herein described may be applied to any water heating receptacle or to any cooking utensil. In the drawings I have shown a tea-kettle designated 10 the wall of which is provided with an opening for receiving the water gage, and within the utensil is mounted a casing 12 which may be of about the form shown in the drawing, having a curved surface, and having connection with the wall at a suitable point above the opening and on each side thereof. The upper portion of the opening is protected at the outside by means of a flanged member 14 preventing moisture which may run down from the cover opening from entering the opening provided for the gage.

The glass tube showing the depth of the water is designated 15 and is retained in position by means of sleeves or sockets 5 in the respective ends of the casing. Surrounding the sleeves are holding or clamping devices, each comprising two-part rings 16, these rings being hinged as shown at 17 and having their projecting ends connected by means of screws or other fastening devices 18.

Two vertically extending rods shown at 20 and 21 serve to protect the tube. The graduations are designated 22 indicating quarts and fractions of quarts. The water inlet for the tube is shown at 24.

What is claimed is:

In a device of the class described, a receptacle provided with an opening in the side thereof, a flanged member extending around the upper edge of the opening, a casing extending inwardly from the opening and having water-tight connection with the walls thereof, a water gage mounted in said casing, means for retaining said water gage in position and comprising a plurality of sleeves connected with the casing at the respective ends thereof for receiving the ends of the gage, a two part clamping device surrounding each sleeve, and protecting rods mounted between the gage and the edges of the opening, the ends of the rods being supported by the clamping devices.

In testimony whereof I affix my signature.

WILFRED LAURIER GREENAWAY.

Copies of this patent may be obtained for five cents each, by addressing the "Commissioner of Patents, Washington, D. C."